Jan. 18, 1938. A. W. HERRINGTON 2,105,917
COMBAT VEHICLE
Filed Aug. 8, 1936 2 Sheets-Sheet 2
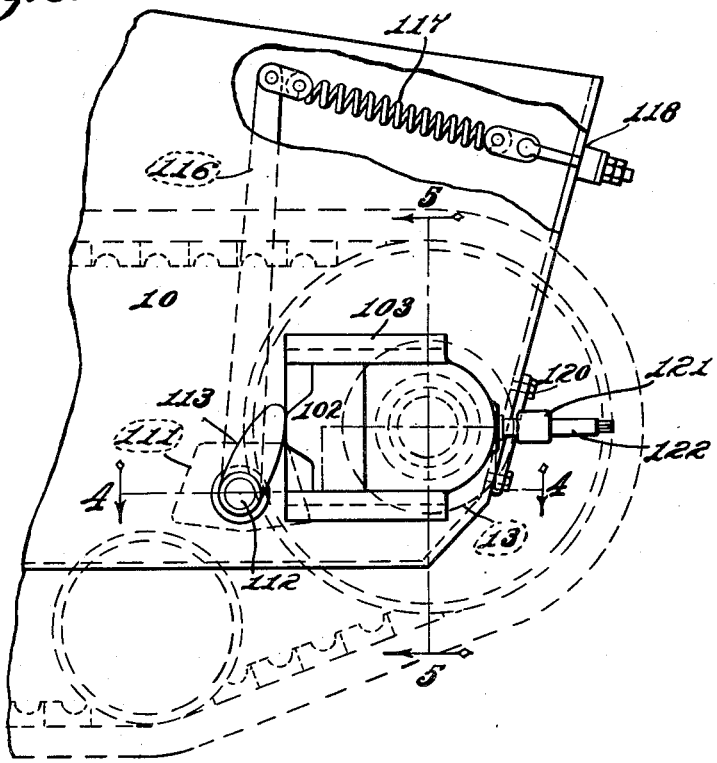
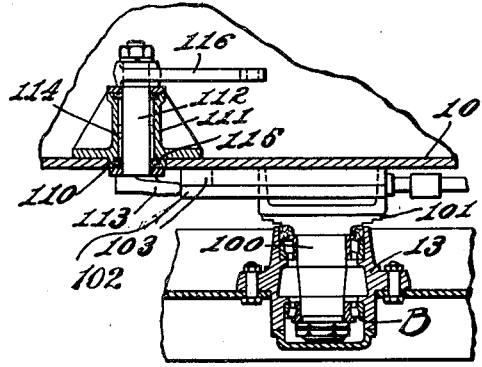
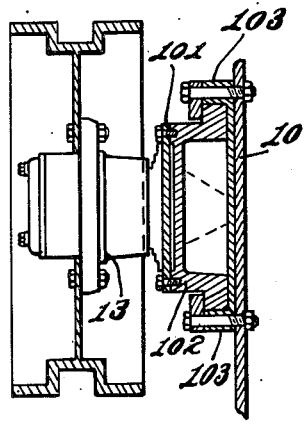
INVENTOR.
Arthur W. Herrington,
BY
Hood & Hahn.
ATTORNEYS.

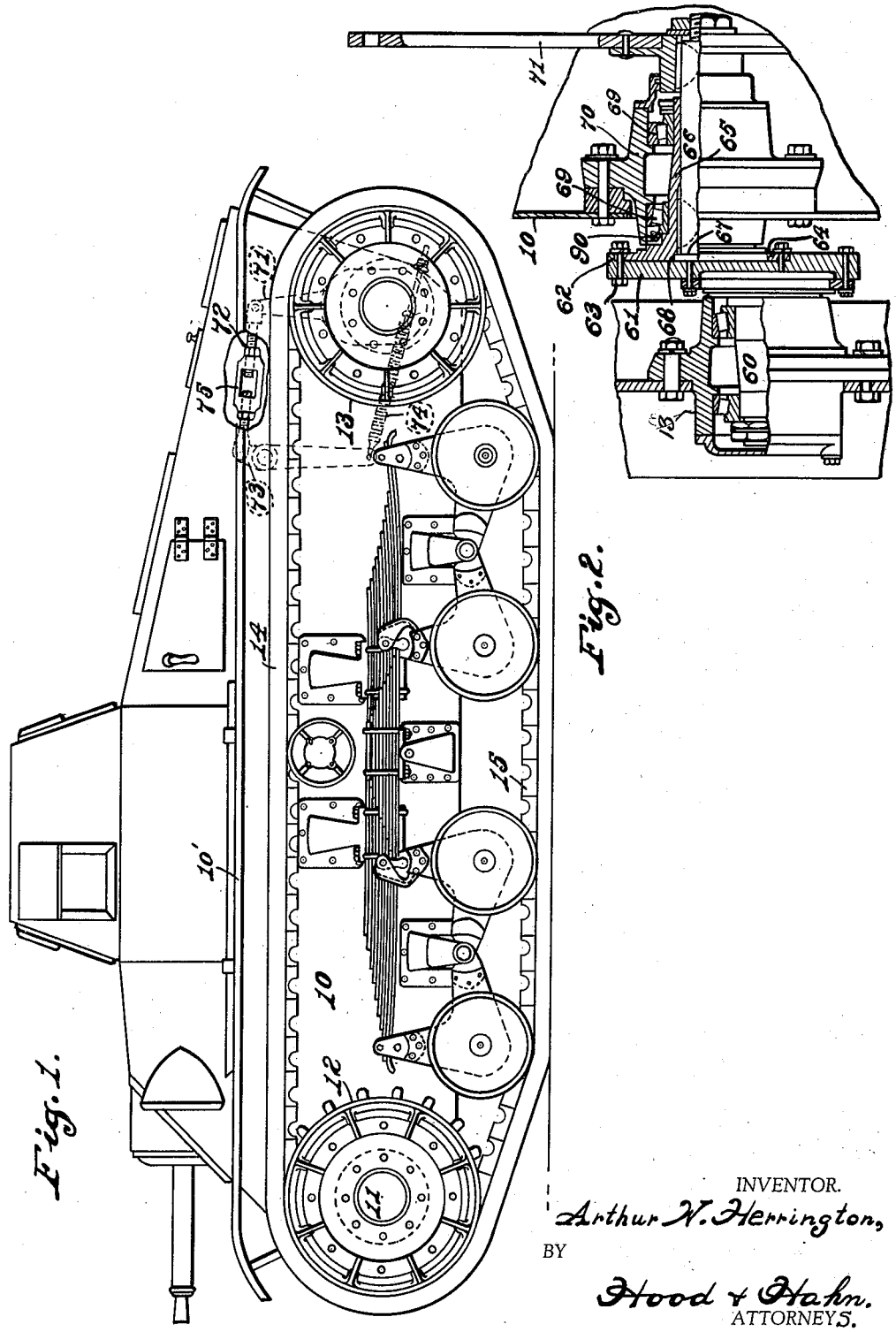

Patented Jan. 18, 1938

2,105,917

UNITED STATES PATENT OFFICE 2,105,917

COMBAT VEHICLE

Arthur W. Herrington, Indianapolis, Ind., assignor to Marmon-Herrington Company, Inc., Indianapolis, Ind., a corporation of Indiana Application August 8, 1936, Serial No. 94,983

8 Claims. (Cl. 180—9.1)

This application is a continuation, in part, of my application Serial No. 39,779, filed September 9, 1935.

The object of the present invention is to provide improved means, in a vehicle of the endless-tread type for supporting one bight of such endless-tread, in connection with a main hull-like main body the major or lower portion of which is desired to be water tight, by which the tension of the endless-tread may be readily adjusted from within the water tight portion of the main body without sacrifice of the water tight characteristics.

The accompanying drawings illustrate my invention:

Fig. 1 is a side elevation of the vehicle embodying my invention, a portion of the main body being broken away to show an internal member of the adjusting means;

Fig. 2 is a fragmentary axial section through the belt supporting idler and the adjustable support therefor;

Fig. 3 is a fragmentary side elevation of a modification;

Fig. 4 is a fragmentary section on line 4—4 of Fig. 3; and

Fig. 5 is a fragmentary section on line 5—5 of Fig. 3.

In the drawings 10 indicates the hull-like main body, the lower portion of which, below the external running board 10', is to be water tight.

Mounted in the forward end of the main body 10 is an axially fixed driving axle structure 11, the ends of which project through the main body, each of the projecting ends carrying an external driving sprocket wheel 12. This axle structure 11 is journaled in bearings carried by the main body, said bearings being of well known form and presenting no difficulty as to packing against entry of water in the main body. At the rear end of the main body, in the longitudinal plane of the sprocket structure 12 is a take-up wheel 13 which supports the rear bight of the endless-track belt 14, the inner face of which carries medial metal links 15, the peripheries of the wheels 12 and 13 being circumferentially grooved or otherwise formed to receive these links.

Referring now to Figs. 1 and 2.

The take-up wheel 13 is journaled upon a pin 60 bolted eccentrically upon the outer face of a plate 61 which, on its opposite face, is provided with a circular pocket 62 eccentric to the axis of pin 60. Held in pocket 62 by bolts 63 is the circular head 64 of a hub, or sleeve, 65, the axis of which is parallel with and variably eccentric to the axis of pin 60.

Sleeve 65 is splined upon a pin 66 which is provided with a head 67 seated in a pocket 68 in the end of sleeve 65 adjacent plate 61. The sleeve 65 is supported by bearings 69 in a sleeve 70 bolted upon the inner face of the side plate of the main body 10. Splined on the inner end of pin 66 is a lever 71 connected by a link 72 with the short arm of a lever 73 pivoted upon the inner face of the side plate of the main body wherein the long arm of lever 73 is connected by a tension spring 74 to a suitable anchorage within the main body. Link 72 is adjustable in length by means of a medial turn-buckle 75.

It will be noted that in this construction the position of the axis of pin 60 relative to the length of the track belt is varied, with variations in the effective length of the belt, by mechanism which is within the hull and, therefore, effectively protected against injury by gun fire or collision.

It will also be noted that the eccentricity of the pin 60 relative to the axis of sleeve 65 may be adjusted by rotating head 64 in its pocket 62, so that considerable variation in length of the track belt may be readily compensated in the field.

The oil seal 90 insures against entry of water in the main body.

Referring now to Figs. 3, 4, and 5. The construction illustrated in these figures, like that shown in Figs. 1 and 2, permits control of tension in the endless track belts from the water-tight interior of the main body and is, perhaps somewhat more sturdy.

In this form the idler 13 is journaled on stud 100 carried by plate 101 which is bolted to the sliding carrier 102 slidably supported in guideways 103, 103 which are bolted to the outer faces of the side plates of main body 10. These guideways may be made very sturdy within the available dimensions and, as the carrier 102 is supported therein along top and bottom edges, carrier 102 furnishes an extremely rigid support for idler 13. Idler sprocket 13 is journaled on stud 100 by means of suitable antifriction bearings B which may be readily grease-packed to exclude water.

Each side wall of the main body 10 is perforated at 110 and secured to the inner face of each side wall at this perforation is a bearing bracket 111 in which is journaled a rock-shaft 112 the outer end of which projects through perforation 110 and carries a cam or finger 113 adapted to bear against the forward edge of carrier 102.

Shaft 112 is supported in suitable bearings 114 which are water-tight at 115, and its inner end carries an arm 116 to which is secured one end of a spring 117 adjustably anchored, at 118, on the rear end wall of the main body 10.

A bracket 120, attached to the outer face of the rear wall of the main body 10, is provided with a threaded ear 121 which carries a threaded stop pin 122 arranged in position to limit movement of carrier 102 under the action of cam 113.

I use the term "hull" herein to designate a motor vehicle body which is hollow and which has a substantial lower zone which is designed to be water-tight and capable of receiving, passengers, motor and other mechanism within that water-tight zone.

I claim as my invention:

1. In a motor vehicle of the endless-tread type, the combination of the hull, a journal bearing piercing a side wall of the hull, a rock shaft journalled in said bearing with one end within the interior of the hull and its other end outside the hull, a wheel-pintle carried by said rock shaft with its axis parallel with and eccentric to the axis of the rock shaft, a belt-supporting idler journalled on said pintle, an arm carried by the inner end of the rock-shaft within the hull, and spring means within the hull and acting upon said arm to rock said shaft in one direction.

2. In a motor vehicle of the endless-tread type, the combination of the hull, a journal bearing piercing a side wall of the hull, a rock shaft journalled in said bearing with one end within the interior of the hull and its other end outside the hull, a wheel-pintle carried by said rock shaft with its axis parallel with and eccentric to the axis of the rock shaft, a belt-supporting idler journalled on said pintle, an arm carried by the inner end of the rock-shaft within the hull, and spring means within the hull and acting upon said arm to rock said shaft in one direction, said means comprising a lever and a variable-length link.

3. In a motor vehicle of the endless-tread type, the combination of the hull, a journal bearing supported by the side wall of the hull, a rock-shaft journalled in said bearing and piercing said side wall, water-sealing means associated with hull and shaft, a wheel-pintle arranged outside the hull and shiftable laterally of its axis, spring means arranged within the hull for biasing said shaft in one direction, and a connection between the outer end of said rock-shaft and said wheel pintle whereby said pintle is laterally biased by said spring means.

4. In a motor vehicle of the endless-tread type, the combination of the hull, a journal bearing carried by the side wall of the hull, a rock-shaft journalled in said bearing and piercing the said side wall, water-sealing means associated with said bearing, spring means within the hull biasing said rock shaft in one direction, a wheel pintle, a carrier for said pintle slidably mounted in ways attached externally to the side wall of the hull, and an arm connecting the outer end of the rock-shaft with said pintle carrier to transfer the spring bias to said pintle.

5. In a motor vehicle of the endless-tread type, the combination of a water-tight hull, an endless-tread belt outside the hull, a sprocket within and overrun by said belt, a rock-shaft projected laterally through said hull adjacent one end of the hull, a pin outside the hull and shiftable laterally of its axis, means connecting said pin and shaft whereby angular movement of the shaft will vary the position of the pin laterally of the shaft axis, a second sprocket wheel journalled on said pin within and overrun by said belt, and means within the hull for angularly adjusting said rock-shaft.

6. In a motor vehicle of the endless-tread type, the combination of a water-tight hull, an endless-tread belt outside the hull, a sprocket within and overrun by said belt, a rock-shaft projected laterally through said hull adjacent one end of the hull, a pin outside the hull and shiftable laterally of its axis, means connecting said pin and shaft whereby angular movement of the shaft will vary the position of the pin laterally of the shaft axis, a second sprocket wheel journalled on said pin within and overrun by said belt, means within the hull for angularly adjusting said rock-shaft, said means including a spring and means for adjusting the effective force thereof.

7. In a motor vehicle of the endless-tread type, the combination of the hull, a journal bearing piercing a side wall of the hull, a rock-shaft journalled in said bearing with one end within the interior of the hull and its other end outside the hull, a wheel-pintle carried by said rock-shaft with its axis parallel with and eccentric to the axis of the rock-shaft, a belt supporting idler journalled on said pintle, an arm carried by the inner end of the rock-shaft within the hull, and means by which said rock-shaft may be angularly adjusted.

8. In a motor vehicle of the endless-tread type, the combination of the hull, a journal bearing piercing a side wall of the hull, a rock-shaft journalled in said bearing with one end within the interior of the hull and its other end outside the hull, a wheel-pintle carried by said rock-shaft with its axis parallel with and eccentric to the axis of the rock-shaft, a belt-supporting idler journalled on said pintle, an arm carried by the inner end of the rock-shaft within the hull, a lever connected to said rock-shaft, and a variable length link interposed between said lever and the hull.

ARTHUR W. HERRINGTON.